United States Patent
Choi et al.

(10) Patent No.: US 8,915,815 B2
(45) Date of Patent: Dec. 23, 2014

(54) POWER TRANSMISSION SYSTEM OF HYBRID ELECTRIC VEHICLE

(71) Applicant: Hyundai Motor Company, Seoul (KR)

(72) Inventors: Woulsun Choi, Suwon-si (KR); Jae Young Choi, Seoul (KR); Seok Joon Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/093,911

(22) Filed: Dec. 2, 2013

(65) Prior Publication Data

US 2014/0162824 A1    Jun. 12, 2014

(30) Foreign Application Priority Data

Dec. 12, 2012   (KR) ........................ 10-2012-0144869

(51) Int. Cl.
  *F16H 3/72*    (2006.01)
  *F16H 37/06*   (2006.01)
  *B60K 6/50*    (2007.10)

(52) U.S. Cl.
  CPC ................ *B60K 6/50* (2013.01); *Y10S 903/902* (2013.01)
  USPC ................................. 475/5; 475/10; 903/902

(58) Field of Classification Search
  USPC ........................................................ 475/1–10
  See application file for complete search history.

(56) References Cited

U.S. PATENT DOCUMENTS

| 7,004,868 B2 * | 2/2006 | Oshidari et al. | 475/5 |
| 7,276,007 B2 * | 10/2007 | Takami et al. | 475/5 |
| 7,479,080 B2 * | 1/2009 | Usoro | 475/5 |

FOREIGN PATENT DOCUMENTS

| JP | 2006183861 A * | 7/2006 |
| JP | 4007403 B1 | 9/2007 |
| JP | 2013-1385 A | 1/2013 |
| KR | 10-1144418 B1 | 5/2012 |

* cited by examiner

*Primary Examiner* — Tisha Lewis
(74) *Attorney, Agent, or Firm* — Morgan, Lewis & Bockius LLP

(57) ABSTRACT

A power transmission system may include: an input shaft receiving engine torque; a first planetary gear set disposed on the input shaft and including a first sun gear selectively connected to a transmission housing, a first ring gear directly connected to the input shaft, and a first planet carrier; a second planetary gear set disposed on the input shaft and including a second sun gear, a second ring gear selectively connected to the first ring gear and selectively connected to the transmission housing, and a second planet carrier directly connected to the first planet carrier and directly connected to an output gear; a first motor/generator directly connected to the first sun gear; and a second motor/generator directly connected to the second sun gear.

5 Claims, 2 Drawing Sheets

FIG.2

|      | CL1 | BK1 | BK2 |
|------|-----|-----|-----|
| EV1  |     | ●   |     |
| EV2  | ●   | ●   |     |
| EVT1 |     | ●   |     |
| EVT2 | ●   |     |     |
| FG   | ●   |     | ●   |

POWER TRANSMISSION SYSTEM OF HYBRID ELECTRIC VEHICLE

CROSS-REFERENCE TO RELATED APPLICATION

The present application claims priority of Korean Patent Application Number 10-2012-0144869 filed on Dec. 12, 2012, the entire contents of which application are incorporated herein for all purposes by this reference.

BACKGROUND OF INVENTION

1. Field of Invention

The present invention relates to a power transmission system of a hybrid electric vehicle. More particularly, the present invention relates to a power transmission system of a hybrid electric vehicle overcoming deterioration of system efficiency due to power reuse, reducing capacity of a motor, raising a weight of mechanical power delivery path in high-speed driving so as to reduce electric load, and enabling of using maximum power of an engine.

2. Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of the environmentally-friendly vehicles are an electric vehicle (EV) which is a zero emission vehicle (ZEV) and a fuel cell electric vehicle (FCEV). The electric vehicle and the fuel cell electric vehicle have merits of no emission, but have limitation due to technical problems such as capacitance and life of a battery and social infrastructure construction such as charging stations.

Therefore, a hybrid electric vehicle is developed and commercialized. The hybrid electric vehicle generates driving torque by using a conventional internal combustion engine and an electric motor. The hybrid electric vehicle is a vehicle driven by combining electric power and power of an internal combustion engine. Because the internal combustion engine and the electric motor are controlled to operated at high-efficiency operating points according to the hybrid electric vehicle, efficiency may be excellent and exhaust gas may be reduced.

In addition, construction of charging stations that is problems of the electric vehicle is unnecessary, fuel economy can be improved, and travel distances are similar to those of the conventional internal combustion engine vehicle according to the hybrid electric vehicle. Therefore, it is expected that the hybrid electric vehicles feature future environmentally-friendly vehicles.

The hybrid electric vehicle using a power split device such as a planetary gear set is called a power split type hybrid electric vehicle. Power flow of the power split type hybrid electric vehicle includes mechanical flow where engine torque is directly transmitted to an output shaft and electric flow where electricity is generated using the engine torque and a battery is charged by the generated electricity or a motor is driven by energy of the charged battery.

Since the engine can be operated independent from the output shaft in the power split type hybrid electric vehicle, the engine can be freely powered on or off during running and an electric vehicle mode can be achieved. In addition, since a power transmission system of the power split type hybrid electric vehicle can be operated as an electrically variable transmission (EVT) by using two motor/generators, engine may be driven efficiently.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a power transmission system of a hybrid electric vehicle having advantages of overcoming deterioration of system efficiency due to power reuse, reducing capacity of a motor, raising a weight of mechanical power delivery path in high-speed driving so as to reduce electric load, and enabling of using maximum power of an engine.

A power transmission system of a hybrid electric vehicle according to various aspects of the present invention may include: an input shaft receiving engine torque; a first planetary gear set disposed on the input shaft and including a first sun gear selectively connected to a transmission housing, a first ring gear directly connected to the input shaft, and a first planet carrier; a second planetary gear set disposed on the input shaft and including a second sun gear, a second ring gear selectively connected to the first ring gear and selectively connected to the transmission housing, and a second planet carrier directly connected to the first planet carrier and directly connected to an output gear; a first motor/generator directly connected to the first sun gear; and a second motor/generator directly connected to the second sun gear.

The first planetary gear set may be a double pinion planetary gear set, and the second planetary gear set may be a single pinion planetary gear set.

The power transmission system may further include a first clutch disposed between the first ring gear and the second ring gear, a first brake disposed between the second ring gear and the transmission housing, and a second brake disposed between the first sun gear and the transmission housing.

The first brake may be operated at a first electric vehicle mode, the first clutch and the first brake may be operated at a second electric vehicle mode, the first brake may be operated at a first hybrid mode, the first clutch may be operated at a second hybrid mode, and the first clutch and the second brake may be operated at a fixed gear mode.

A power transmission system of a hybrid electric vehicle according to various other aspects of the present invention may include: an input shaft receiving engine torque; a first planetary gear set being a double pinion planetary gear set and including a first sun gear selectively connected to a transmission housing, a first ring gear directly connected to the input shaft, and a first planet carrier; a second planetary gear set being a single pinion planetary gear set and including a second sun gear, a second ring gear selectively connected to the first ring gear and selectively connected to the transmission housing, and a second planet carrier directly connected to the first planet carrier and directly connected to an output gear; a first motor/generator directly connected to the first sun gear; a second motor/generator directly connected to the second sun gear; a first clutch disposed between the first ring gear and the second ring gear; a first brake disposed between the second ring gear and the transmission housing; and a second brake disposed between the first sun gear and the transmission housing.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of a power transmission system according to the present invention.

DETAILED DESCRIPTION

Figure 1:
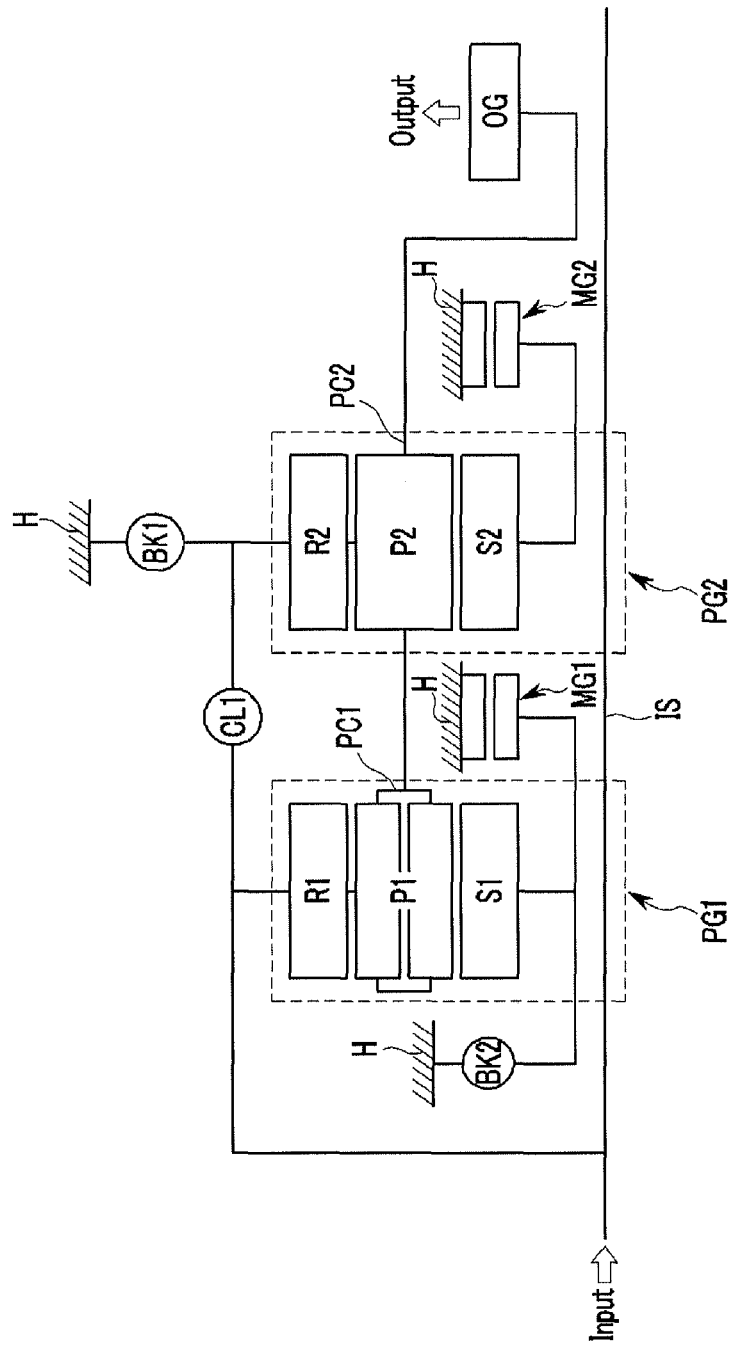
FIG. 1 is a schematic diagram of a power transmission system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the illustrated exemplary embodiments will be omitted, and the same constituent elements are denoted by the same reference numerals in this specification. In the detailed description, ordinal numbers are used for distinguishing constituent elements having the same terms, and have no specific meanings.

FIG. 1 is a schematic diagram of a power transmission system according to various embodiments of the present invention. Referring to FIG. 1, a power transmission system of a hybrid electric vehicle includes an input shaft IS, an output gear OG, first and second planetary gear sets PG1 and PG2, three friction elements CL1, BK1, and BK2, and two motor/generators MG1 and MG2.

Therefore, torque transmitted through the input shaft IS and torque transmitted from the first and second motor/generators MG1 and MG2 are converted by cooperation of the first and second planetary gear sets PG1 and PG2, and then is output through the the output gear OG.

The input shaft IS is an input member, and torque from a crankshaft of the engine is transferred or transmitted through a torque converter and is input to the input shaft IS. Instead of the torque converter, any device which can transmit the torque of the engine to the power transmission system may be used. The output gear OG is an output member and transmits driving torque to a driving wheel through a differential apparatus.

The first planetary gear set PG1 is a double pinion planetary gear set, and includes a first sun gear S1, a first ring gear R1, and a first planet carrier PC1 rotatably supporting a first pinion P1 engaged to the first sun gear S1 and the first ring gear R1. The second planetary gear set PG2 is a single pinion planetary gear set, and includes a second sun gear S2, a second ring gear R2, and a second planet carrier PC2 rotatably supporting a second pinion P2 engaged to the second sun gear S2 and the second ring gear R2. The first planet carrier PC1 is directly connected to the second planet carrier PC2, and the first ring gear R1 is selectively connected to the second ring gear R2.

The planetary gear sets PG1 and PG2 are combined by the first and second motor/generators MG1 and MG2 and friction elements including one clutch CL1 and two brakes BK1 and BK2.

The first and second motor/generators MG1 and MG2 are connected to a high voltage battery through an inverter so as to charge the high voltage battery in regenerative braking and to generate driving torque by using electricity supplied from the high voltage battery in driving. The first motor/generator MG1 is directly connected to the first sun gear S1, and the second motor/generator MG2 is directly connected to the second sun gear S2.

In addition, the friction elements are conventional multi-plate friction elements of wet type that are operated by hydraulic pressure, but are not limited to these.

The first clutch CL1 is disposed between the first ring gear R1 and the second ring gear R2, the first brake BK1 is disposed between the second ring gear R2 and a transmission housing H, and the second brake BK2 is disposed between the first sun gear S1 and the transmission housing H. Therefore, the first sun gear S1 receives torque from the first motor/generator MG1 and are operated as a selective fixed element by the second brake B2.

The first and second planet carriers PC1 and PC2 are directly connected to the output gear OG and are operated as a final output element. The first ring gear R1 is directly connected to the input shaft IS and is operated as an input element which receives the torque of the engine. The second sun gear S2 receives torque from the second motor/generator MG2. The second ring gear R2 is selectively connected to the first ring gear R1 through the first clutch CL1 so as to be operated as a selective input element, and is operated as a selectively fixed element by the first brake B1.

Figure 2:
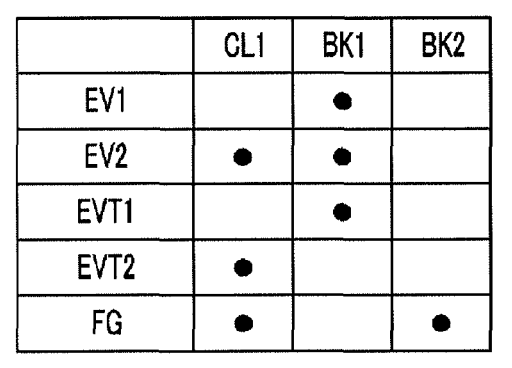

FIG. 2 is an operational chart of a power transmission system according to various embodiments of the present invention. Referring to FIG. 2, operation of the friction elements at each mode will be described in detail.

The first brake BK1 is operated at a first electric vehicle mode EV1. The first clutch CL1 and the first brake B1 are operated at a second electric vehicle mode EV2. The first brake BK1 is operated at a first hybrid mode EVT1. The first clutch CL1 is operated at a second hybrid mode EVT2. The first clutch CL1 and the second brake BK2 are operated at a fixed gear mode FG.

The power transmission system according to various embodiments of the present invention can achieve two EV modes, two hybrid modes, and one fixed gear mode. Operation of the power transmission system at each mode will be described in detail.

First electric vehicle mode. If the first brake BK1 is operated and electricity is applied to the second motor/generator MG2, the torque of the second motor/generator MG2 is output through the second planet carrier PC2 connected to the output gear OG. Therefore, the first electric vehicle mode is achieved. Since the engine is stopped at this time, the first motor/generator MG1 connected to the first sun gear S1 rotates to a reverse direction, but it does not have any effect on driving of the vehicle.

Second electric vehicle mode. If the first clutch CL1 and the first brake BK1 are operated, the first and second motor/generators MG1 and MG2 can be used as motors. Therefore, the second electric vehicle mode is achieved. Since the driving torques of two motors are output at the second electric vehicle mode, driving torque of the vehicle can be maximized. Therefore, the first and second motor/generators MG1 and MG2 can be used suitably for torque performance needed in the power transmission system. In addition, capacities of the first and second motor/generators MG1 and MG2 can be reduced if the exemplary embodiments of the present invention are applied to a plug-in hybrid electric vehicle.

First hybrid mode. If the engine is started by the first motor/generator MG1 in a state that the first brake BK1 is operated, the first hybrid mode is achieved. The first motor/generator MG1 is operated as a generator and controls shift ratio. In addition, since the second ring gear R2 is operated as the fixed element, the second motor/generator MG2 cannot control the shift ratio and is operated as the motor so as to transmit the torque to the output gear OG.

Second hybrid mode. If the first brake BK1 is released and the first clutch CL1 is operated at the first hybrid mode, the first ring gear R1 and the second ring gear R2 are connected and the second motor/generator MG2 rotates to the reverse direction. At this state, the first motor/generator MG1 is operated as the generator and the second motor/generator MG2 is operated as the motor. Therefore, the second hybrid mode is achieved.

Fixed gear mode FG. If the first clutch CL1 and the second brake BK2 are operated, the first sun gear S1 is stopped by the second brake BK2, the second planet carrier PC2 connected to the output gear OG rotates faster than the first ring gear R1 connected to the engine does. Since the first motor/generator MG1 does not transmit the torque at this time, the shift ratio is formed only by the second planetary gear set PG2. In addition, since the engine is directly connected the first and second planetary gear sets PG1 and PG2 at the fixed gear mode, efficiency at the fixed gear mode is superior to that at power split mode. In addition, a parallel hybrid system where the motor as well as the engine is operated can be achieved at the fixed gear mode.

According to the present invention, two electric vehicle modes, two hybrid modes, and one fixed gear mode can be achieved by combining two planetary gear sets PG1 and PG2, three friction elements CL1, BK1, and BK2, and two motor/generators MG1 and MG2. In addition, deterioration of system efficiency due to power reuse may be overcome, capacity of a motor may be reduced, a weight of mechanical power delivery path in high-speed driving may be raised so as to reduce electric load, and maximum power of an engine can be used.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A power transmission system of a hybrid electric vehicle, comprising:
    an input shaft receiving engine torque;
    a first planetary gear set disposed on the input shaft and including a first sun gear selectively connected to a transmission housing, a first ring gear directly connected to the input shaft, and a first planet carrier;
    a second planetary gear set disposed on the input shaft and including a second sun gear, a second ring gear selectively connected to the first ring gear and selectively connected to the transmission housing, and a second planet carrier directly connected to the first planet carrier and directly connected to an output gear;
    a first motor/generator directly connected to the first sun gear; and
    a second motor/generator directly connected to the second sun gear.

2. The power transmission system of claim 1, wherein the first planetary gear set is a double pinion planetary gear set, and the second planetary gear set is a single pinion planetary gear set.

3. The power transmission system of claim 1, further comprising:
    a first clutch disposed between the first ring gear and the second ring gear;
    a first brake disposed between the second ring gear and the transmission housing; and
    a second brake disposed between the first sun gear and the transmission housing.

4. The power transmission system of claim 3, wherein
    the first brake is operated at a first electric vehicle mode,
    the first clutch and the first brake are operated at a second electric vehicle mode,
    the first brake is operated at a first hybrid mode,
    the first clutch is operated at a second hybrid mode, and
    the first clutch and the second brake are operated at a fixed gear mode.

5. A power transmission system of a hybrid electric vehicle, comprising:
    an input shaft receiving engine torque;
    a first planetary gear set being a double pinion planetary gear set and including a first sun gear selectively connected to a transmission housing, a first ring gear directly connected to the input shaft, and a first planet carrier;
    a second planetary gear set being a single pinion planetary gear set and including a second sun gear, a second ring gear selectively connected to the first ring gear and selectively connected to the transmission housing, and a second planet carrier directly connected to the first planet carrier and directly connected to an output gear;
    a first motor/generator directly connected to the first sun gear;
    a second motor/generator directly connected to the second sun gear;
    a first clutch disposed between the first ring gear and the second ring gear;
    a first brake disposed between the second ring gear and the transmission housing; and
    a second brake disposed between the first sun gear and the transmission housing.

* * * * *